United States Patent
Bunker et al.

(10) Patent No.: US 7,153,599 B2
(45) Date of Patent: Dec. 26, 2006

(54) COOLED TURBINE INTEGRATED FUEL CELL HYBRID POWER PLANT

(75) Inventors: Ronald S. Bunker, Niskayuna, NY (US); Chellappa Balan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 370 days.

(21) Appl. No.: 10/248,167

(22) Filed: Dec. 23, 2002

(65) Prior Publication Data

US 2004/0121207 A1  Jun. 24, 2004

(51) Int. Cl.
*H01M 8/18* (2006.01)
*H01M 8/04* (2006.01)
*H01M 8/10* (2006.01)

(52) U.S. Cl. .............................. 429/20; 429/17; 429/39
(58) Field of Classification Search ................ 331/172, 331/74, 175; 429/14, 30, 17, 34, 20
See application file for complete search history.

(56) References Cited

U.S. PATENT DOCUMENTS

| | | | |
|---|---|---|---|
| 4,622,275 A | 11/1986 | Noguchi et al. | 429/19 |
| 4,743,516 A | 5/1988 | Noguchi et al. | 429/16 |
| 5,084,363 A | 1/1992 | Reiser | 429/19 |
| 5,319,925 A | 6/1994 | Hendriks et al. | 60/39.183 |
| 5,413,879 A | 5/1995 | Domeracki et al. | 429/30 |
| 5,449,568 A | 9/1995 | Micheli et al. | 429/20 |
| 5,482,791 A | 1/1996 | Shingai et al. | 426/635 |
| 5,541,014 A | 7/1996 | Micheli et al. | 429/19 |
| 5,750,278 A | 5/1998 | Gillett et al. | 429/24 |
| 5,811,202 A | 9/1998 | Petraglia | 429/35 |
| 5,963,201 A | 10/1999 | McGreggor et al. | 345/326 |
| 5,968,680 A | 10/1999 | Wolfe et al. | 429/13 |
| 6,007,931 A | 12/1999 | Fuller et al. | 429/13 |
| 6,230,494 B1 | 5/2001 | Botti et al. | 60/649 |

*Primary Examiner*—Patrick Joseph Ryan
*Assistant Examiner*—Thomas H. Parsons
(74) *Attorney, Agent, or Firm*—Fletcher Yoder (57) ABSTRACT

A hybrid power plant includes a turbine, a compressor driven by the turbine and a recuperator in flow communication with the compressor. The recuperator is configured to transfer heat from turbine exhaust to compressed air, and at least one fuel cell is in flow communication with said recuperator to provide fresh air for said fuel cell.

60 Claims, 3 Drawing Sheets

COOLED TURBINE INTEGRATED FUEL CELL HYBRID POWER PLANT

BACKGROUND OF INVENTION

This invention relates generally to power plants, and, more specifically, to hybrid power plants including integrated fuel cells.

In certain hybrid power generation systems, fuel cells have been integrated with conventional gas turbines for increased power generation capacity (efficiency) in electrical power plants. Known fuel cells, such as, for example, solid oxide fuel cells include a plurality of solid fuel cells that react a gaseous fuel, such as reformed natural gas, with air to produce electrical power and a hot gas. The gas turbine compressor supplies the air for the fuel cells, which operate at elevated pressure, and the fuel cells produce hot gas for expansion in the turbine. Fuel cell stack exhaust air is combined with fuel cell stack exhaust fuel and the resulting heat release is converted to work in the turbine portion of the plant. Thus, electrical power is produced by both the solid oxide fuel cell generator and the turbine. See, for example, U.S. Pat. No. 5,413,879. Known such systems, however, are disadvantaged in several aspects.

For example, the fuel cell stacks are required to operate within narrow temperature limits that are imposed by the physical and thermodynamic processes produced therein to generate electricity. Typically a regenerative heat exchanger is used to raise the inlet air stream of the fuel cell to an acceptable temperature. The regenerative heat exchanger introduces substantial cost and complexity to the power plant that can be prohibitive in certain applications.

Further, once an acceptable inlet temperature for the fuel cells is achieved, maintaining a uniform fuel cell stack temperature and outlet temperature often necessitates a supply of air considerably in excess of that required to chemically generate electricity in the fuel cells. Supplying this excess air to maintain uniform temperatures in the fuel cell tends to result in large compression losses. The provision of excess air tends to reduce an inlet temperature of the turbine portion of the plant and compromises overall thermodynamic efficiency of the system.

Still further, solid-oxide fuel cells usually do not convert all of the fuel that is fed into the inlet of the fuel cells. Composition of the outlet stream from the fuel cells primarily includes $CO$, $CO_2$, $H_2$, and $H_2O$ along with the equilibrium species. In the absence of means to burn the partly spent fuel, the heat content of these constituents is wasted, thereby reducing thermodynamic efficiency of the plant. Additionally, unburned hydrocarbons may also be undesirably emitted into the atmosphere when fuel for the fuel cells in not completely converted.

It would be desirable to provide a lower cost plant with reduced emissions and increased thermodynamic efficiency.

SUMMARY OF INVENTION

In one aspect, a hybrid power plant is provided. The plant comprises a turbine, a compressor driven by said turbine, a recuperator in flow communication with said compressor, said recuperator configured to transfer heat from turbine exhaust to compressed air, and at least one fuel cell in flow communication with said recuperator. The recuperator provides fresh air for said fuel cell.

In another aspect, a hybrid power plant is provided. The plant comprises a compressor, a turbine driving said compressor, and a recuperator in flow communication with said compressor and transferring heat from turbine exhaust to compressed air. At least one fuel cell stack is in flow communication with said recuperator to provide air for said fuel cell stack, the fuel cell stack comprises a cathode inlet and a cathode outlet, said cathode inlet in flow communication with said recuperator for receiving compressed air. A blower is configured to mix cathode exhaust with air from said recuperator prior to entering said cathode inlet.

In another aspect, a hybrid power plant is provided. The plant comprises a compressor, a recuperator in flow communication with said compressor, and a solid oxide fuel cell stack in flow communication with said recuperator to provide air for said fuel cell stack. The fuel cell stack comprises a cathode inlet and a cathode outlet, said cathode inlet in flow communication with recuperator for receiving compressed air. The cathode outlet and the cathode inlet are in flow communication with one another through a cathode re-circulation flow path, and the recuperator is configured to transfer heat from exhaust of said turbine to compressed air prior to entering said cathode inlet.

In another aspect, a hybrid power plant is provided. The plant comprises a solid oxide fuel cell stack comprising a cathode inlet and a cathode outlet, and a recuperator supplying air to said cathode inlet, said cathode outlet in flow communication with said cathode inlet along a cathode re-circulation flow path. A gas turbine portion comprises a turbine, a compressor driven by said turbine, and a recuperator receiving air from said compressor. The recuperator is heated by exhaust from said turbine and provides a coolant air flow to a coolant flow path of said turbine, and the coolant flow path of said turbine is in flow communication with said cathode inlet to provide a fresh air supply thereto. A blower is configured to re-circulate air from said cathode outlet to said cathode inlet. The solid oxide fuel stack further comprises an anode inlet in flow communication with a reformer. The anode outlet is in flow communication with said reformer along a re-circulation flow path, and said cathode outlet is in flow communication with said reformer prior to said cathode re-circulation flow path. A tail gas burner is in flow communication with said anode outlet and with said reformer, and said tail gas burner receives a mixture of fuel exhaust from said anode outlet and spent air. The tail gas burner exhausts combustion gas to said turbine.

In another aspect, a power plant is provided comprising a fuel cell comprising an anode, a cathode and an electrolyte interposed therebetween, said cathode having a cathode inlet and a cathode outlet. A recuperator is in flow communication with said cathode inlet, and a compressor is in flow communication with said recuperator. The recuperator is in flow communication with at least one of a turbine working fluid flow path for transferring heat therefrom to said recuperator, a return air path extending from said recuperator to a turbine cooling fluid path, a re-circulation flow path diverting a portion of airflow from said recuperator back to said recuperator, and an air supply flow path from said recuperator to said cathode inlet.

In another aspect, a power plant is provided. The plant comprises a fuel cell comprising an anode, a cathode and an electrolyte interposed therebetween, said cathode having a cathode inlet and a cathode outlet. A recuperator is in flow communication with said fuel cell, and a compressor is in flow communication with said recuperator. A gas turbine comprises a cooling fluid path in flow communication with at least one of a recuperator bypass path from said compressor, a return flow path from said recuperator, and a cathode inlet flow path, and the gas turbine further comprises a working fluid path in flow communication with said recuperator and transferring heat therefrom, a tail gas burner exhaust path for producing work, and a catalytic chamber exhaust path for producing work.

In still another aspect, a method of integrating a gas turbine and a fuel cell is provided. The fuel cell includes a cathode inlet and a cathode outlet and an anode inlet and an anode outlet. The method utilizes a compressor and a recuperator, and the turbine includes a cooling fluid path and a working fluid path. The method comprises introducing a compressed air flow into said recuperator, introducing turbine exhaust to the recuperator, thereby heating said compressed air, introducing heated compressed air from said recuperator to said cathode inlet, introducing fuel flow into the anode inlet, and electrochemically reacting said air flow with said fuel flow within the fuel cell to generate an anode outlet flow and a cathode outlet flow and electric power, wherein said anode outlet flow and said cathode outlet flow are at higher temperatures than the anode inlet flow and the cathode inlet flow, respectively.

DETAILED DESCRIPTION

Figure 1:
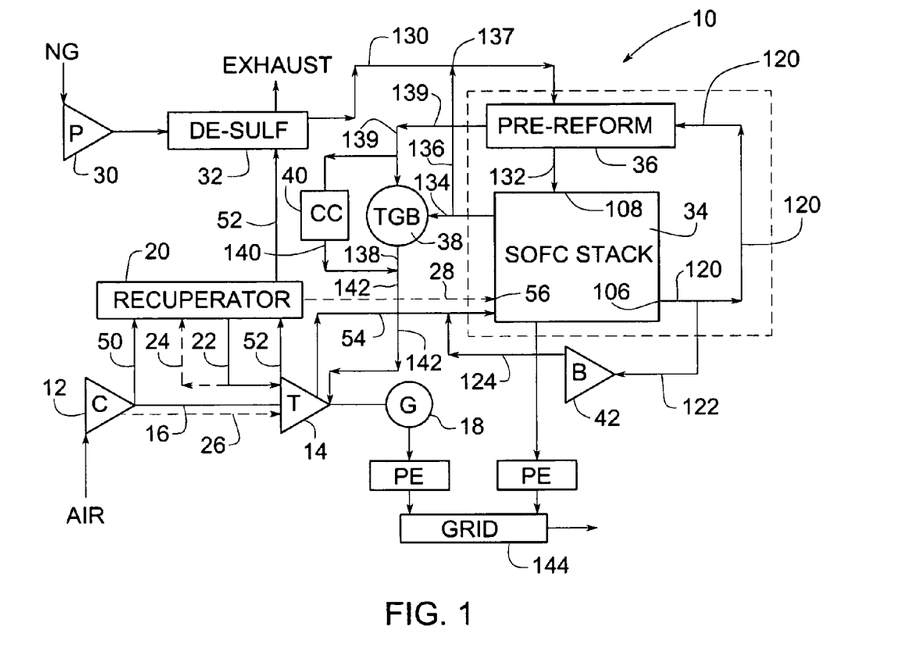
FIG. 1 is a schematic diagram of an exemplary integrated fuel cell hybrid power plant.

FIG. 1 schematically illustrates an exemplary integrated gas turbine and fuel cell hybrid power plant 10 including a fuel cell portion and a turbine portion for producing electricity in tandem with one another. The turbine portion includes a compressor 12, a turbine 14, a rotor 16 by which turbine 14 drives compressor 12, an electrical generator 18, and a recuperator 20. The fuel cell portion includes a fuel pump 30, a de-sulfurizer 32, a fuel cell stack 34, a fuel preformer 36 for fuel cell stack 34, a tail gas burner 38, a catalytic chamber 40 and an exhaust blower 42. As explained in some detail below, while the basic components of plant 10 are well known, efficiency improvements in relation to known plants are obtained through strategic interconnection of plant components with re-circulation flow paths to enhance performance and efficiency of the system. As will be seen below, plant efficiency is improved by recycling air and fuel streams exhausted from the fuel cell portion to extract as much work as possible from air and fuel streams in the fuel cell and turbine portions of the system, and utilizing heat generated in the turbine portion for the benefit of the fuel cell portion.

In operation, compressor 12 is a multi-stage compressor including rows of stationary vanes and rotating blades, and compressor 12 inducts ambient air and produces a compressed air stream 50 at an outlet of compressor 12. The compressed air stream 50 is directed along a flow path toward recuperator 20, which is a known type of heat exchanger including isolated flow paths. Compressed air stream enters recuperator 20 in one recuperator flow path, and a turbine exhaust stream 52 is passed into recuperator 20 in another recuperator flow path, whereby heat from the turbine exhaust is transferred to compressed air stream 50 from the compressor outlet without mixing of compressed air stream 50 and turbine exhaust stream 52. Thus, compressed air stream 50 is heated within recuperator 20 by turbine exhaust stream 52. By heating compressed air stream 50 with turbine exhaust 52, the costs of conventional heaters and/or regenerative heat exchangers to raise a temperature of the fuel cell oxidant are avoided, and turbine exhaust stream 52 is cooled before being discharged into the atmosphere.

To further cool turbine 14, a return flow path 22 provides air flow from recuperator 20 to coolant paths in turbine 14. As those in the art will appreciate, turbine 14 includes coolant paths and working fluid paths therein for respective coolant and working functions. The coolant paths and the working paths are isolated from one another to prevent mixing of fluid in the paths, but the paths are in heat transfer relationship to one another so that heat may be transferred from the turbine working fluid paths to the turbine coolant fluid paths. When recuperator return flow path 22 is in fluid communication with the turbine coolant paths, fresh air from compressor 12 flows through return path 22 to provide a cooling airflow in turbine 14. Reducing the heat load on structural components of the turbine extends an operative life of turbine 14 and enhances performance of turbine. Airflow through return path 22 to turbine 14 may be regulated to provide optimal cooling for turbine 14 in use.

In an alternative embodiment, a re-circulation path 24 (shown in phantom in FIG. 1) may be provided to divert a portion of air in return path 22 back to recuperator 20 where it is again heated by turbine exhaust 52. In a further alternative embodiment, cool air from compressor 12 may be fed directly into coolant paths of turbine 14 through a recuperator bypass flow path 26. It is further contemplated that various combinations of recuperator return path 22, re-circulation path 24, and recuperator bypass flow path 26 may be employed in different embodiments of the invention to provide suitable cooling and re-circulation airflow to turbine 14 for optimal operation of the gas turbine portion of plant 10.

In an exemplary embodiment, heated compressed air stream from recuperator 20 flows through return path 22 to the coolant paths of turbine 14, and heat from turbine 14 further warms returned air 22 to provide a heated compressed air stream 54 in flow communication with a cathode inlet 56 of fuel cell stack 34 to provide an oxidant therein. Alternatively, in a further embodiment heated compressed air may be supplied to cathode inlet 56 directly from recuperator 20 through an air supply path 28 (shown in phantom in FIG. 1) without passing through turbine 14. It is also recognized that air could be supplied to fuel stack 34 from both flow path 54 and flow path 28 in a further alternative embodiment. In still further embodiments, re-circulating flow paths may extend from flow paths 28 and/or and 54 to turbine cooling paths for further and or alternative cooling of turbine 14 in lieu of or in addition to return path 22 supplying a coolant flow to turbine 14.

Figure 2:
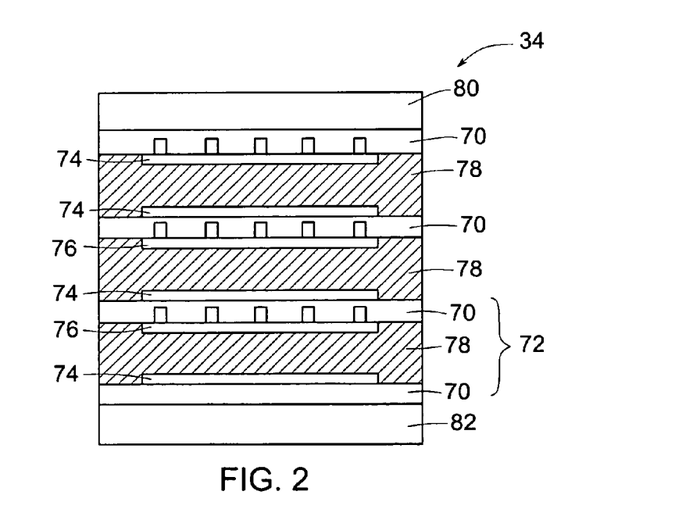
FIG. 2 is a schematic illustration of an exemplary fuel cell stack for the power plant shown in FIG. 1.

In an exemplary embodiment, and in accordance with known fuel cells as illustrated in FIG. 2, fuel cell stack 34 includes a number of interconnects 70, each interconnect 70 defining a fuel manifold. Each interconnect 70 also includes at least one flow field for flowing a reagent, such as an oxidant or a fuel across interconnects 70. Exemplary flow fields in interconnects 70 are formed from metals that possess sufficient electrical conductivity, resist oxidation, maintain mechanical strength and are chemically stable under the operating conditions of the fuel cell.

Fuel cell stack 34 also includes at least one fuel cell unit 72 comprising an anode 74, a cathode 76, and an electrolyte 78 disposed between anode 74 and cathode 76. Electrolytes 78 are impermeable with respect to both the fuel and the oxidant. In an exemplary embodiment, fuel cell units 70 are solid oxide fuel cell (SOFC) units with an oxygen-ion conducting solid electrolyte, such as yttria stabilized zirconia (YSZ), ceria-doped zirconia, or lanthanum strontium gallium manganate, although it is contemplated that in alternative embodiments, fuel cell units 70 may include, for example, proton exchange membrane (PEM) electrolytes, molten carbonate electrolytes or other known electrolyte materials suitable for use in fuel cell stack 34. Fuel cell 34, as described and illustrated herein, is set forth for illustrative purposes only, and it is appreciated that a variety of fuel cells may benefit from the flow path scheme set forth herein without departing from the scope and spirit of the present invention.

Anodes 74 are positioned adjacent to respective interconnects 70 and are configured to be in both electrical connection and fluid communication with interconnects 70. Flow fields of interconnects 70 supply both electrical connection and fluid communication, and the flow fields are configured to guide a fuel flow from a fuel intake manifold to a fuel exhaust manifold over the surface of anodes 74. Likewise, cathodes 76 are positioned adjacent interconnect 70 and are configured to be in both electrical connection and fluid communication with interconnects 70. Flow fields of interconnects 70 provide an electrical connection to cathodes 76 and are configured to guide an oxidant flow, such as air, over the surface of cathodes 76. Interconnects 70 include a number of sealing features to prevent fuel flow over cathodes 76 and oxidant flow over anodes 74.

In order to generate a larger voltage across the stack 34, fuel cell stack 34 includes a number of planar fuel cell units 72 arranged in a vertical stack. As will be recognized by those skilled in the art, the particular configuration of three planar fuel cell units 72 shown in FIG. 2 is for illustrative purposes only, and the specific number of planar fuel cell units 72 included in stack 34 will vary depending on the power requirements of the stack 34. In the illustrated embodiment, each of two pairs of adjacent planar fuel cell units 72 shares an interconnect 70, with the interconnect 70 being adjacent and electrically connected to and in fluid communication with an anode 74 of one of the adjacent planar fuel cell units 70 and with a cathode 76 of the other adjacent planar fuel cell unit 72. For this particular embodiment, each of the interconnects 70, which is shared by the adjacent planar fuel cell units 72, includes a flow field on each side thereof for electrical connection and to provide fluid communication for the adjacent anode 74 and cathode 76 of the neighboring planar fuel cell units 70. While the illustrated embodiment includes planar fuel cell units, it is appreciated that other known fuel cell units, including but not limited to tubular fuel cell units, could be employed in alternative embodiments.

In order to close the stack 34 and to collect electrical current from the planar fuel cell units 72, fuel cell stack 34 includes a top end plate 80, which is disposed above an upper one of the planar fuel cell units 72, and a bottom end plate 82, which is disposed below a lower one of the planar fuel cell units 72. End plates 80, 82 are adapted for current collection, and exemplary top and bottom end plates 80, 82 are formed of ferritic stainless steel. In addition, end plates 80, 82 cap the fuel cell stack 34, preventing the fuel and oxidant from bypassing the fuel cell stack 10. In the illustrated example, an electric potential between the two end plates 80, 82 is the total voltage of the fuel cell stack 34 and equals the sum of the voltages of the individual cells 72.

Figure 3:
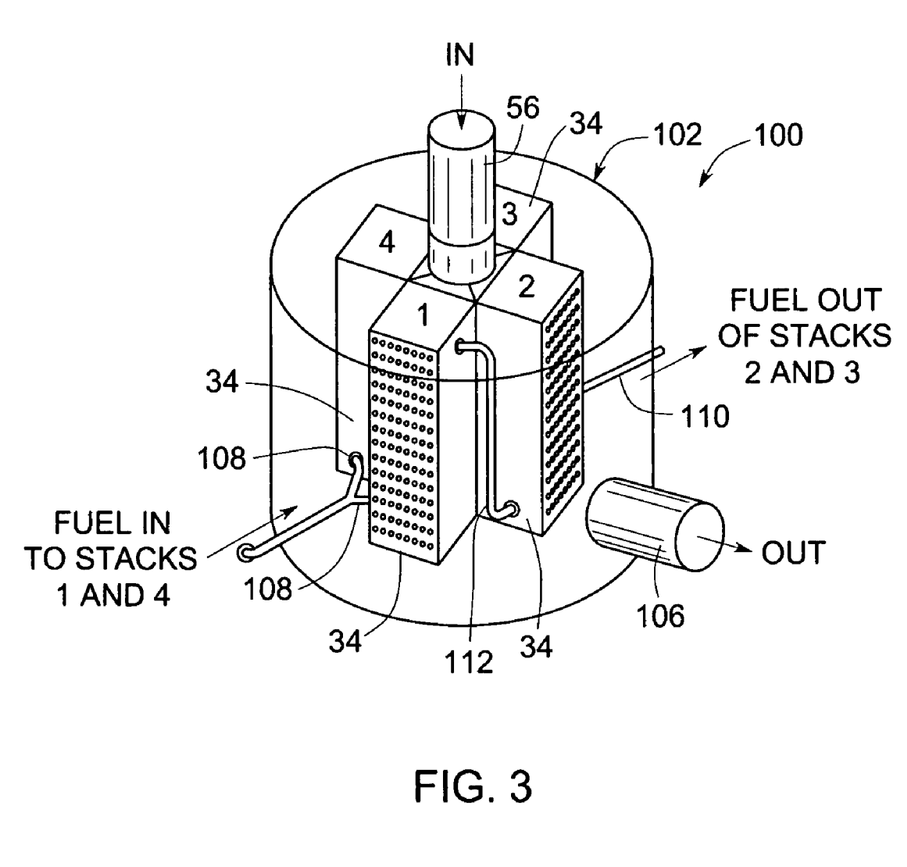
FIG. 3 is perspective view of an exemplary fuel cell module for the power plant shown in FIG. 1.

As illustrated in FIG. 3, fuel cell stacks 34 may be integrated into a module 100 including a vessel 102 having an inlet 56 and an outlet 106, which are configured to respectively receive and exhaust an oxidant, for example air. A number of fuel cell stacks 34 are arranged in a ring within vessel 102. At least one fuel cell stack 34 has a fuel inlet 108, and at least one fuel cell stack 34 has a fuel outlet 110 for receiving and exhausting a fuel flow, respectively. Piping 112 connects stacks 34 to provide fuel flow from one stack to another. Each fuel cell stack 34 includes fuel intake and exhaust manifolds and oxidant intake and exhaust manifolds for receiving and exhausting the fuel flow and the oxidant flow from interconnects 70 (shown in FIG. 2) of the fuel cell stacks 34.

Air inlet 56 and air outlet 106 are referred to herein as a cathode inlet and a cathode outlet, respectively, as they respectively provide oxidant airflow for the cathodes of fuel cells 34. Similarly fuel inlet 108 and fuel outlet 110 are referred to herein as an anode inlet and an anode outlet, respectively, as they respectively provide fuel flow for the anodes of fuel cells 34.

Referring back to FIG. 1, the heated compressed air stream 54 from the coolant paths of turbine 14 enters fuel cell stack 34 through cathode inlet 56 and flows through the fuel cell units in stack 34 to provide an electricity producing chemical reaction with a fuel (discussed below) also flowing through the fuel cell units. Spent (i.e., oxygen depleted) air 120 is exhausted from fuel stack 34 through cathode outlet 106 and is partly diverted into a lower pressure re-circulation flow path 122 in flow communication with a pressure increasing device, such as blower 42. Blower 42 raises a pressure of the air and expels air therefrom in a higher pressure re-circulation flow path 124 to provide a re-circulated air stream which is fed back to compressed and heated air stream 54 to cathode inlet 56. The re-circulated air stream in re-circulation flow path 124 is therefore mixed with fresh air stream 54 at a flow path junction 126. Mixing of re-circulated spent air exhausted from fuel cell stack 24 with fresh air 54 through re-circulation flow path 124 is advantageous in several respects.

For example, re-circulation of hot exhaust air from fuel cell stack 34 and mixing it with fresh air from compressor air 54 raises an air temperature at cathode inlet 56 by a direct mass and heat transfer process. A need for diffusive heat transfer provided by a heat exchanger in conventional systems is therefore eliminated. Coupled with turbine exhaust flow 52 in recuperator 20 to heat compressed air 50, a considerably lower cost and less complex heat exchanger, such as recuperator 20, may be employed.

Additionally, re-circulated air from fuel cell stack exhaust 106 via flow path 124 increases an air mass flow rate to fuel cell stack 34 at cathode inlet 56 and facilitates a substantially constant total system air flow rate for increased system performance. The increased air mass flow to stack 34 at cathode inlet 56 produces greater temperature uniformity within the stack and further enhances performance of fuel cell stack 34. As such, higher fuel flow rates are possible for a given constant range of stack temperatures. Higher fuel flow rates at substantially constant total system air flow reduces the amount of total excess air, and thereby raises the firing temperature of turbine 14, as explained below, enhancing overall system performance.

Still further, with sufficient amounts of re-circulated air mixing with fresh air supply 54 through flow path 124, a limit of a stoichiometric operation of the fuel cell stack may be approached relative to the incoming fresh air.

Even further, re-circulated air flow path 124 effectively reduces cathode concentration of $O_2$ concentration in fuel cell stack 34, which is known to be a key degradation mechanism in hot fuel cells. It is therefore believed that re-circulated air flow path 124 provides enhanced performance and longer life of the hot fuel cell stack.

A portion of cathode exhaust 120 that is not diverted to blower 42 for re-circulation flows to reformer 36 in which gaseous hydrocarbons may be reformed, for example, in the presence of steam and a nickel catalyst into hydrogen and carbon monoxide. Heat from cathode exhaust 120 is transferred thereby to reformer 36 which, in turn, heats cooler fuel (described below) flowing into reformer 36 prior to entering fuel cell stack 34. In different embodiments, fuel reformation may be accomplished in an external fuel reformer 36 or in a reformer integral with fuel cell stack 34.

Gaseous fuel, which in different embodiments may be natural gas or a coal derived fuel gas, is driven by fuel pump 30 through a de-sulferizer 32, which in an exemplary embodiment includes a vessel containing a bed of sulfur sorbent through which fuel flows. Heat from turbine exhaust 52 is transferred to de-sulferizer 32 to warm fuel therein before being exhausted from plant 10. Complexity and expense of an external heater for de-sulferizer 32 is therefore avoided, and turbine exhaust is cooled before being discharged from the plant.

De-sulfurized fuel 130 flows from de-sulfurizer 32 to reformer 36 so that fuel may be reformed therein prior to entering the fuel cells of fuel cell stack 34. For example, the fuel is reformed to change its composition from Methane or natural gas to an acceptable composition for reaction in the fuel cell (e.g., hydrogen, $CO_2$ and water). Once treated therein, reformed fuel 132 flows from reformer 36 to anode inlet 108 and into the fuel cells of stack 34. Once expended in the fuel cells, spent fuel 134 is exhausted from fuel cell stack 34 through anode exhaust 110. A portion of the exhausted fuel 134 is diverted into a re-circulation fuel stream flow path 136 that mixes with fresh de-sulfurized fuel 130 at a junction 137. Re-circulation of hot exhausted fuel via re-circulation flow path 136 further avoids external fuel heaters and re-introduces unspent fuel into fuel cell stack 34, thereby increasing fuel efficiency in the system. Re-circulation of exhausted fuel could be accomplished, for example, with a blower, an ejector pump, another pressure increasing device or the like as those in the art will appreciate. In a further and or alternative embodiment, steam may be introduced to the fuel to facilitate reforming.

A portion of exhaust fuel 134 not diverted to re-circulation stream flow path 136 is fed to a tail gas burner 38 for combustion therein. A portion of the spent (i.e., oxygen depleted) air 139 from fuel cell stack 34 is also fed into tail gas burner 38, and a mixture of spent air 139 and exhausted fuel 134 is combusted in tail gas burner 38. Combustion exhaust 138 is fed to the working fluid paths in gas turbine 14 to provide added heat and pressure for expansion of gas in turbine 14. A portion of spent air 139 not flowing to tail gas burner 38 is directed in a tail gas burner bypass flow path to a catalytic chamber 40 to clean the air therein. Cleaned air 140 from catalytic chamber 40 is mixed with exhaust 138 of tail gas burner 38 prior to entering the working fluid flow paths of turbine 14 to produce a cleaned exhaust stream 142 that is fed to gas turbine 14, thereby reducing emissions from plant 10.

While catalytic chamber 40 is believed to be advantageous in an exemplary embodiment, it is appreciated that the advantages of the invention may be appreciated in the absence of a catalytic chamber without departing from the scope of the present invention.

By controlling injection of spent air 139 and exhausted fuel 134 in tail gas burner 38, it can be ensured that the fuel/air mixture is lean and within flammability limits. Thus, virtually of the fuel components remaining in the exhausted fuel stream 134 are combusted in tail gas burner, thereby fully utilizing fuel in the system and preventing discharge of fuel in exhaust from plant 10.

Hot exhaust 142 from tail gas burner 38 and catalytic chamber 40 is fed to the working fluid paths of gas turbine 14, and thermodynamic expansion of the exhaust produces work and exerts motive forces therein to drive the turbine, which, in turn, generates electricity in generator 18. Electricity from generator 18 and fuel cell stack 34 are converted to an appropriate form and to a distribution power supply network, illustrated as grid 144 in FIG. 1.

For at least the reasons set forth above, power plant 10 provides better overall plant performance in relation to known systems while providing turbine structural cooling and improved temperature control of the fuel cell stack through re-circulation flow paths while avoiding complexity and costs of conventional heat exchangers to maintain the fuel cell stack at desired temperatures. Re-circulation of fuel cell stack cathode exhaust also facilitates inlet air temperature control to the fuel cell stack, which, in turn, provides for more precise control of temperature rise and uniformity within the fuel cell stack. Re-circulation of fuel cell stack cathode exhaust provides increased turbine section inlet temperature to provide more work in the turbine, provides for increased performance retention via reduced cathode side oxidation, permits fuel cell stack operation at stoichiometric conditions, and simplifies exhaust after-treatment before discharging plant exhaust to the atmosphere.

Figure 4:
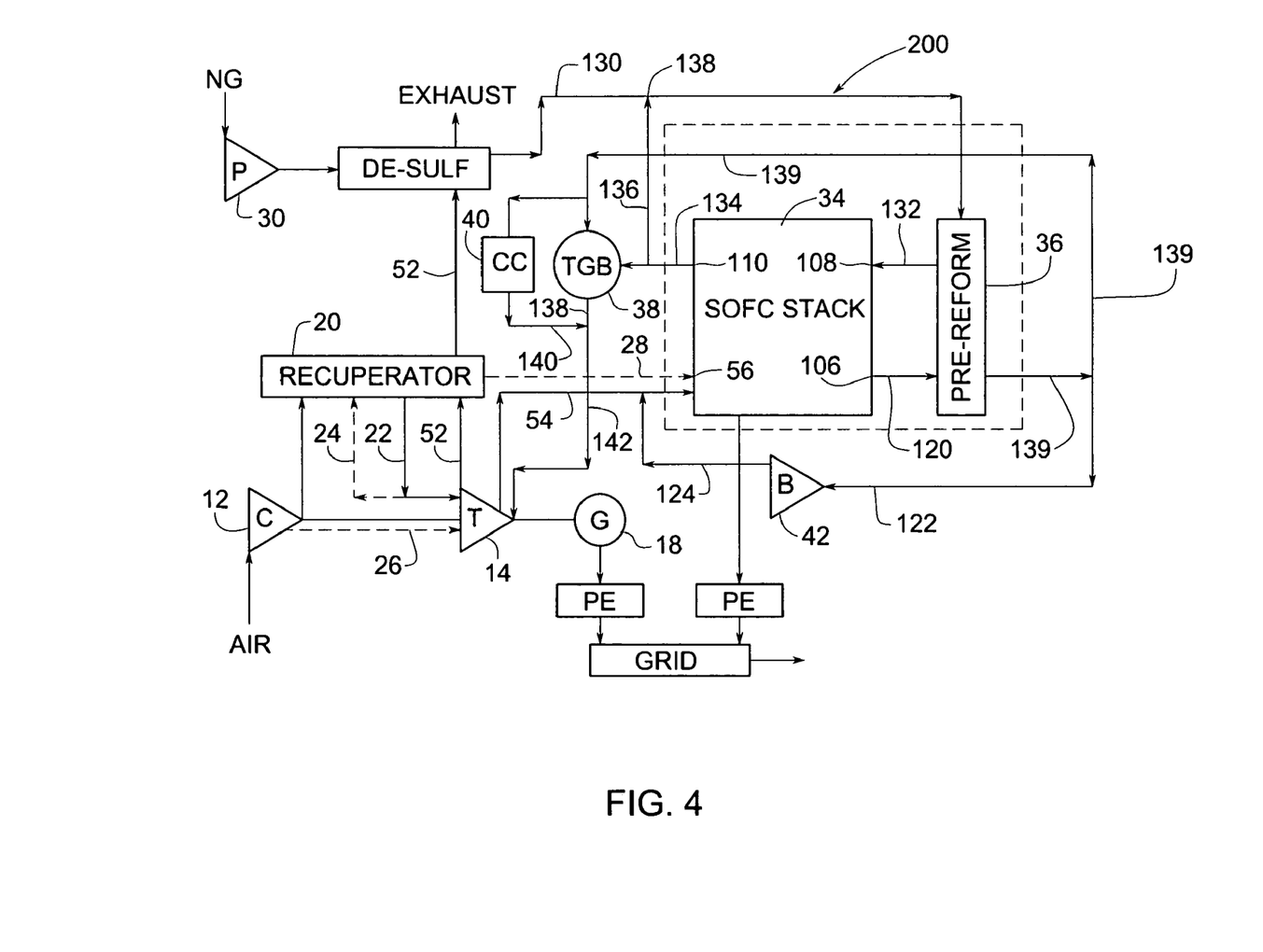
FIG. 4 is a schematic diagram of a second embodiment of an integrated fuel cell hybrid power plant.

FIG. 4 is a schematic diagram of a second embodiment of an integrated fuel cell hybrid power plant 200 sharing the basic components of power plant 10 (shown in FIG. 1) in which like features are designated with like reference characters.

In the gas turbine portion of plant 200, compressor 12 supplies compressed air to recuperator 20, and compressed air within recuperator 20 is heated by turbine exhaust 52 as described above. Return flow path 22 feeds heated compressed air 22 in a heat transfer relationship to turbine 14 to further heat the air and produce a heated air stream to cathode inlet 56 of fuel cell stack 34. In further and/or alternative embodiments, recuperator re-circulation path 24 (shown in phantom in FIG. 4), recuperator bypass path 26 (shown in phantom in FIG. 4) and/or cathode air supply path 28 (shown in phantom in FIG. 4) may be provided to facilitate structural cooling of turbine 14 and temperature control of inlet air temperature at cathode inlet 56 of fuel cell stack 34. In fuel cell stack 34, the air is reacted with a fuel to generate electricity as described above.

Spent air 120 exhausted from cathode outlet 106 is passed to reformer 36. Heat from cathode exhaust 120 is transferred thereby to reformer 136 which, in turn, heats cooler fuel flowing into reformer 36 prior to entering fuel cell stack 34. Cathode exhaust therefore exits reformer 36 as spent cleaned air 139. A portion of spent air 139 is diverted to a lower pressure re-circulation flow path 122 fluidly communicating with blower 42. Blower 42 increases the pressure of the air and expels spent air in path 122 to a higher pressure re-circulation flow path 124 that is mixed with heated compressed air 54 prior to entering fuel cell stack 34. The benefits of mixing cathode exhaust with fresh air 54 via re-circulation path 124 are noted above.

Gaseous fuel, which in different embodiments may be natural gas or a coal derived fuel gas, is driven by fuel pump 30 through de-sulferizer 32. Heat from turbine exhaust 52 is transferred to de-sulferizer 32 to warm fuel therein before being exhausted from plant 10. Complexity and expense of an external heater for de-sulferizer 32 is therefore avoided, and turbine exhaust is cooled before being discharged from the plant.

De-sulfurized fuel 130 flows from de-sulfurizer 32 to reformer 36 so that fuel may be reformed therein prior to entering the fuel cells of fuel cell stack 34. For example, the fuel is reformed to change its composition from Methane or natural gas to an acceptable composition for reaction in the fuel cell (e.g., hydrogen, $CO_2$, and water). Once treated therein, reformed fuel 132 flows from reformer 36 to anode inlet 108 and into the fuel cells of stack 34. Once expended in the fuel cells, spent fuel 134 is exhausted from fuel cell stack 34 through anode exhaust 110. A portion of the exhausted fuel 134 is diverted into a re-circulation fuel stream flow path 136 that mixes with fresh de-sulfurized fuel 130 at a junction 138. Re-circulation of hot exhausted fuel via re-circulation flow path 136 further avoids external fuel heaters and re-introduces unspent fuel into fuel cell stack 34, thereby increasing fuel efficiency in the system.

A portion of exhaust fuel 134 not diverted to re-circulation stream flow path 136 is fed to a tail gas burner 38 for combustion therein. A portion of the spent (i.e., oxygen depleted) air 139 from fuel cell stack 34 is also fed into tail gas burner 38, and a mixture of spent air 139 and exhausted fuel 134 is combusted in tail gas burner 38. Combustion exhaust 138 is fed to gas turbine 14 to provide added heat and pressure to turbine 14. A portion of spent air 139 not flowing to tail gas burner 38 is directed to tail gas burner bypass flow path and to catalytic chamber 40 to clean the air therein. Cleaned air 140 from catalytic chamber 40 is mixed with exhaust 138 of tail gas burner 38 prior to entering turbine 14 to produce a cleaned exhaust stream 142 that is fed to the working fluid paths of gas turbine 14, thereby reducing emissions from plant 200.

While catalytic chamber 40 is believed to be advantageous in an exemplary embodiment, it is appreciated that the advantages of the invention may be appreciated in the absence of a catalytic chamber without departing from the scope of the present invention.

By controlling injection of spent air 139 and exhausted fuel 134 in tail gas burner 38, it can be ensured that the fuel/air mixture is lean and within flammability limits. Thus, virtually all of the fuel components remaining in the exhausted fuel stream 134 are combusted in tail gas burner, thereby fully utilizing fuel in the system and preventing discharge of fuel in exhaust from plant 10.

Hot exhaust 142 from tail gas burner 38 and catalytic chamber 40 is fed to an inlet of gas turbine 14, and thermodynamic expansion of the exhaust produces work and exerts motive forces to drive the turbine, which, in turn, generates electricity in generator 18. Electricity from generator 18 and fuel cell stack 34 are converted to an appropriate form and to a distribution power supply network, illustrated as grid 144 in FIG. 1.

For at least the reasons set forth above, power plant 200 provides better overall plant performance in relation to known systems while providing turbine structural cooling and improved temperature control of the fuel cell stack through re-circulation flow paths while avoiding complexity and costs of conventional heat exchangers to maintain the fuel cell stack at desired temperatures. Re-circulation of fuel cell stack cathode exhaust also facilitates inlet air temperature control to the fuel cell stack, which, in turn, provides for more precise control of temperature rise and uniformity within the fuel cell stack. Re-circulation of fuel cell stack cathode exhaust provides increased turbine section inlet temperature to provide more work in the turbine, provides for increased performance retention via reduced cathode side oxidation, permits fuel cell stack operation at stoichiometric conditions, and simplifies exhaust after-treatment before discharging plant exhaust to the atmosphere.

Comparing plant 200 with plant 10 (shown in FIG. 1), analysis has demonstrated that plant 200 provides better overall plant performance and efficiency in relation to plant 10, while plant 10 provides more cooling for turbine than does plant 200.

While the invention has been described in terms of various specific embodiments, those skilled in the art will recognize that the invention can be practiced with modification within the spirit and scope of the claims.

The invention claimed is:

1. A hybrid power plant comprising:
   a turbine;
   a compressor driven by said turbine;
   a recuperator in flow communication with said compressor, said recuperator configured to transfer heat from turbine exhaust to compressed air;
   a return flow path between said recuperator and a coolant flow path of said turbine, said recuperator supplying cooling air to said turbine through said return flow path; and
   at least one fuel cell in flow communication with said recuperator, said recuperator providing fresh air for said fuel cell.

2. A hybrid power plant in accordance with claim 1, said fuel cell comprising a cathode inlet and a cathode outlet, said cathode inlet in flow communication with said recuperator for receiving compressed air.

3. A hybrid power plant in accordance with claim 2, said cathode outlet in flow communication with said cathode inlet along a re-circulation flow path.

4. A hybrid power plant in accordance with claim 3 further comprising a reformer, said reformer in fluid communication with said cathode outlet and in fluid communication with said re-circulation flow path, said reformer located between said cathode outlet and said re-circulation path.

5. A hybrid power plant in accordance with claim 1 further comprising a recuperator bypass path extending between said compressor and said turbine and feeding compressed air directly to a coolant path of said turbine.

6. A hybrid power plant in accordance with claim 1, said at least one fuel cell comprising an anode inlet and an anode outlet, said anode outlet in flow communication with said anode inlet along a re-circulation flow path.

7. A hybrid power plant in accordance with claim 6 further comprising a tail gas burner in flow communication with said anode outlet, said tail gas burner receiving a mixture of anode fuel exhaust and air.

8. A hybrid power plant in accordance with claim 1 wherein said at least one fuel cell comprises a solid oxide fuel cell.

9. A hybrid power plant comprising:
   a compressor;
   a turbine driving said compressor;
   a recuperator in flow communication with said compressor and transferring heat from turbine exhaust to compressed air;
   at least one fuel cell stack in flow communication with said recuperator to provide air for said fuel cell stack, said fuel cell stack comprising a cathode inlet and a cathode outlet, said cathode inlet in flow communication with said recuperator for receiving compressed air;

a blower configured to mix cathode exhaust with air from said recuperator prior to entering said cathode inlet; and a recuperator bypass path extending between said compressor and said turbine and feeding compressed air directly to a coolant path of said turbine.

10. A hybrid power plant in accordance with claim 9 further comprising a reformer, said reformer in flow communication with said cathode outlet and in flow communication with said blower, said reformer located in a flow path between said cathode outlet and said blower.

11. A hybrid power plant in accordance with claim 9, said fuel cell further comprising an anode inlet and an anode outlet, said anode outlet in flow communication with said anode inlet along a re-circulation flow path.

12. A hybrid power plant in accordance with claim 11 further comprising a tail gas burner in flow communication with said anode outlet, said tail gas burner receiving a mixture of anode fuel exhaust and air.

13. A hybrid power plant in accordance with claim 9 further comprising a re-circulation flow path diverting a portion of air flowing from said recuperator toward said cathode inlet.

14. A hybrid power plant in accordance with claim 9, said recuperator in flow communication with a coolant path of said turbine, said coolant path of said turbine in flow communication with said cathode inlet.

15. A hybrid power plant in accordance with claim 9 wherein said at least one fuel cell stack comprises a solid oxide fuel cell stack.

16. A hybrid power plant comprising:
a compressor;
a turbine driving said compressor;
a recuperator in flow communication with said compressor;
a solid oxide fuel cell stack in flow communication with said recuperator to provide air for said fuel cell stack, said fuel cell stack comprising a cathode inlet and a cathode outlet, said cathode inlet in flow communication with said recuperator for receiving compressed air, said cathode outlet and said cathode inlet in flow communication with one another through a cathode re-circulation flow path;
a blower located along said cathode re-circulation flow path; and
a recuperator bypass path extending between said compressor and said turbine and feeding compressed air directly to a coolant path of said turbine;
wherein said recuperator is configured to transfer heat from exhaust of said turbine to compressed air prior to entering said cathode inlet.

17. A hybrid power plant in accordance with claim 16, said solid oxide fuel cell stack further comprising an anode inlet and an anode outlet, said anode outlet in flow communication with said anode inlet along an anode re-circulation flow path.

18. A hybrid power plant in accordance with claim 17 further comprising a tail gas burner in flow communication with said anode outlet, said tail gas burner receiving a mixture of anode fuel exhaust and spent air.

19. A hybrid power plant in accordance with claim 18, said tail gas burner exhausting combustion gas to a working fluid path of said turbine.

20. A hybrid power plant in accordance with claim 17 further comprising a reformer in flow communication with said anode inlet.

21. A hybrid power plant in accordance with claim 17, said reformer further in flow communication with said cathode re-circulation flow path.

22. A hybrid power plant comprising:
a solid oxide fuel cell stack comprising a cathode inlet and a cathode outlet;
a recuperator supplying air to said cathode inlet, said cathode outlet in flow communication with said cathode inlet along a cathode re-circulation flow path;
a gas turbine portion comprising a turbine, a compressor driven by said turbine, and a recuperator receiving air from said compressor;
said recuperator heated by exhaust from said turbine and providing a recuperator bypass path extending between said compressor and said turbine and feeding compressed air directly to a coolant path of said turbine, said coolant flow path of said turbine in flow communication with said cathode inlet to provide a fresh air supply thereto;
a blower configured to re-circulate air from said cathode outlet to said cathode inlet;
said solid oxide fuel cell stack further comprising an anode inlet in flow communication with a reformer, said anode outlet in flow communication with said reformer along a re-circulation flow path, said cathode outlet in flow communication with said reformer prior to said cathode re-circulation flow path; and
a tail gas burner in flow communication with said anode outlet and with said reformer, said tail gas burner receiving a mixture of fuel exhaust from said anode outlet and spent air, said tail gas burner exhausting combustion gas to said turbine.

23. A hybrid power plant in accordance with claim 22, said tail gas burner in flow communication with a working fluid path of said turbine, said tail gas burner thereby exhausting combustion products to said working fluid path.

24. A power plant comprising:
a fuel cell comprising an anode, a cathode and an electrolyte interposed therebetween, said cathode having a cathode inlet and a cathode outlet; and
a recuperator in flow communication with said cathode inlet; and
a compressor in flow communication with said recuperator; and
said recuperator in flow communication with at least one of a turbine working fluid flow path for transferring heat therefrom to said recuperator, a return air path extending from said recuperator to a turbine cooling fluid path, a re-circulation flow path diverting a portion of airflow from said recuperator back to said recuperator, and an air supply flow path from said recuperator to said cathode inlet.

25. A power plant in accordance with claim 24 wherein said recuperator is in flow communication with at least two of a turbine working fluid flow path for transferring heat therefrom to said recuperator, a return air path extending from said recuperator to a turbine cooling fluid path, a re-circulation flow path diverting a portion of airflow from said recuperator back to said recuperator, and an air supply flow path from said recuperator to said cathode inlet.

26. A power plant in accordance with claim 24 wherein said recuperator is in flow communication with at least three of a turbine working fluid flow path for transferring heat therefrom to said recuperator, a return air path extending from said recuperator to a turbine cooling fluid path, a re-circulation flow path diverting a portion of airflow from said recuperator back to said recuperator, and an air supply flow path from said recuperator to said cathode inlet.

27. A power plant in accordance with claim 24 further comprising a recuperator bypass flow path extending from said compressor to a turbine cooling fluid path.

28. A power plant in accordance with claim 24 further comprising an air re-circulation flow path connecting said cathode outlet to said cathode inlet for re-circulating a portion of a cathode outlet flow to heat a cathode inlet flow.

29. A power plant in accordance with claim 24 further comprising a pressure-increasing device for raising the pressure of said re-circulating portion of said cathode outlet flow.

30. A power plant in accordance with claim 24 wherein said fuel cell further comprises an anode inlet and an anode outlet.

31. A power plant in accordance with claim 30 further comprising a fuel re-circulation flow path connecting said anode outlet to said anode inlet for re-circulating a portion of an anode outlet flow to heat an anode inlet flow.

32. A power plant in accordance with claim 31, further comprising a reformer interposed between said fuel re-circulation flow path and said anode inlet.

33. A power plant in accordance with claim 30 further comprising a tail gas burner having a tail gas inlet and a tail gas outlet, said tail gas inlet coupled to said anode outlet and said cathode outlet for oxidizing at least a portion of an anode outlet flow with at least a portion of a cathode outlet flow to produce a tail gas burner exhaust flow.

34. A power plant in accordance with claim 33 further comprising a tail gas burner bypass flow path coupled to said cathode outlet and said tail gas outlet for bypassing a portion of said cathode outlet flow around said tail gas burner.

35. A power plant in accordance with claim 34 further comprising a catalytic converter disposed between said tail gas burner bypass flow and said tail gas outlet for oxidizing fuel present within said portion of said cathode outlet flow.

36. A power plant in accordance with claim 33 further comprising a gas turbine coupled to said tail gas burner, wherein said tail gas burner exhaust exerts motive forces upon said gas turbine to produce work.

37. A hybrid power plant in accordance with claim 34 further comprising a gas turbine coupled to said tail gas burner, wherein said tail gas burner exhaust and said tail gas burner bypass flow exert motive forces upon said gas turbine to produce work.

38. A power plant comprising:
  a fuel cell comprising an anode, a cathode and an electrolyte interposed therebetween, said cathode having a cathode inlet and a cathode outlet; and
  a recuperator in flow communication with said fuel cell; and
  a compressor in flow communication with said recuperator; and
  a gas turbine comprising a cooling fluid path in flow communication with at least one of a recuperator bypass path from said compressor, a return flow path from said recuperator, and a cathode inlet flow path;
  said gas turbine further comprising a working fluid path in flow communication with said recuperator and transferring heat therefrom, a tail gas burner exhaust path for producing work, and a catalytic chamber exhaust path for producing work.

39. A power plant in accordance with claim 38 wherein said gas turbine comprises a cooling fluid path in flow communication with at least two of a recuperator bypass path from said compressor, a return flow path from said recuperator, and a cathode inlet flow path.

40. A power plant in accordance with claim 39 wherein said gas turbine further comprises a working fluid path in flow communication with said recuperator and transferring heat therefrom, a tail gas burner exhaust path for producing work, and a catalytic chamber exhaust path for producing work.

41. A power plant in accordance with claim 38 further comprising a recuperator bypass flow path extending from said compressor to a turbine cooling fluid path.

42. A power plant in accordance with claim 38 further comprising an air re-circulation flow path connecting said cathode outlet to said cathode inlet for re-circulating a portion of a cathode outlet flow to heat a cathode inlet flow.

43. A power plant in accordance with claim 38 further comprising a pressure-increasing device for raising the pressure of said re-circulating portion of said cathode outlet flow.

44. A power plant in accordance with claim 38 wherein said fuel cell further comprises an anode inlet and an anode outlet.

45. A power plant in accordance with claim 44 further comprising a fuel re-circulation flow path connecting said anode outlet to said anode inlet for re-circulating a portion of an anode outlet flow to heat an anode inlet flow.

46. A power plant in accordance with claim 45 further comprising a reformer interposed between said fuel re-circulation flow path and said anode inlet.

47. A power plant in accordance with claim 46 further comprising a tail gas burner having a tail gas inlet and a tail gas outlet, said tail gas inlet coupled to said anode outlet and said cathode outlet for oxidizing at least a portion of an anode outlet flow with at least a portion of a cathode outlet flow to produce a tail gas burner exhaust flow.

48. A power plant in accordance with claim 46 further comprising a tail gas burner bypass flow path coupled to said cathode outlet and said tail gas outlet for bypassing a portion of said cathode outlet flow around said tail gas burner.

49. A power plant in accordance with claim 48 further comprising a catalytic converter disposed between said tail gas burner bypass flow path and said tail gas outlet for oxidizing fuel present within said portion of said cathode outlet flow.

50. A method of integrating a gas turbine and fuel cell, the fuel cell including a cathode inlet and a cathode outlet and an anode inlet and an anode outlet, the method utilizing a compressor and a recuperator, the turbine including a cooling fluid path and a working fluid path, said method comprising:
  introducing a compressed air flow into said recuperator;
  introducing turbine exhaust to the recuperator, thereby heating said compressed air;
  introducing heated compressed air from said recuperator to said cathode inlet;
  introducing fuel flow into the anode inlet; and
  electrochemically reacting said air flow with said fuel flow within the fuel cell to generate an anode outlet flow and a cathode outlet flow and electric power, wherein said anode outlet flow and said cathode outlet flow are at higher temperatures than the anode inlet flow and the cathode inlet flow, respectively;
  wherein introducing heated compressed air from said recuperator to said cathode inlet comprises passing the heated compressed air stream through the cooling path of the turbine prior to introducing the stream to the cathode inlet.

51. A method in accordance with claim 50 further comprising re-circulating a portion of the cathode outlet flow to the cathode inlet flow to heat the compressed air flow introduced to the cathode inlet.

52. A method in accordance with claim 51 further comprising pressurizing said re-circulating portion of said cathode outlet flow before re-circulation to said compressed air flow.

53. A method in accordance with claim 51 further comprising re-circulating a portion of said anode outlet flow to said anode inlet to heat and reform said compressed fuel flow.

54. A method in accordance with claim 51 further comprising oxidizing at least a portion of the anode outlet flow with at least a portion of the cathode outlet flow so as to produce a high temperature mixed flow.

55. A method in accordance with claim 54 wherein oxidizing at least a portion of the anode outlet flow with at least a portion of the cathode outlet flow and re-introducing the bypassed portion into the high temperature mixed flow comprises bypassing a portion of said cathode outlet flow.

56. A method in accordance with claim 55, further comprising oxidizing fuel within the bypassed portion of said cathode outlet flow.

57. A method in accordance with claim 55 further comprising utilizing the high temperature mixed flow to generate work within said gas turbine.

58. A method in accordance with claim 57 further comprising utilizing the high temperature mixed flow and the bypassed portion of the cathode outlet flow to generate work within said gas turbine.

59. A method in accordance with claim 57 further comprising recovering at least of portion of a high temperature gas turbine exhaust flow to exchange heat with at least one lower temperature fluid flow.

60. A method in accordance with claim 50 wherein introducing heated compressed air from said recuperator to said cathode inlet comprises re-circulating a portion of said heated compressed air stream back to the recuperator.

* * * * *